United States Patent [19]
Feret et al.

[11] Patent Number: 5,798,406
[45] Date of Patent: Aug. 25, 1998

[54] FLUORINATED ACRYLIC AND METHACRYLIC LATICES AND MIXTURES THEREOF, PROCESSES FOR MANUFACTURING THEM AND THEIR APPLICATIONS IN THE FIELD OF HYDROPHOBIC COATINGS

[75] Inventors: Bruno Feret, Levallois; Laure Sarrazin, Boisney; Didier Vanhoye, Bernay, all of France

[73] Assignee: Elf Atochem S.A., France

[21] Appl. No.: 544,693

[22] Filed: Oct. 18, 1995

[30] Foreign Application Priority Data

Oct. 18, 1994 [FR] France ................. 94 12431

[51] Int. Cl.[6] ........................................... C08J 3/02
[52] U.S. Cl. .................. 524/501; 523/201; 524/458; 524/460; 524/520; 524/546; 524/805
[58] Field of Search .................. 523/201; 524/458, 524/460, 520, 546, 545, 805, 501

[56] References Cited

U.S. PATENT DOCUMENTS

| | | | |
|---|---|---|---|
| 3,940,359 | 2/1976 | Chambers | 524/430 |
| 4,514,537 | 4/1985 | Cavanaugh | 524/265 |
| 4,529,785 | 7/1985 | Ohmori et al. | 526/247 |
| 4,564,561 | 1/1986 | Lore et al. | 524/520 |
| 4,666,977 | 5/1987 | Kihara et al. | 524/805 |
| 4,694,035 | 9/1987 | Kasai et al. | 524/458 |
| 4,735,990 | 4/1988 | Kihara et al. | 526/245 X |
| 4,812,337 | 3/1989 | Sugimura et al. | 524/520 |
| 4,988,771 | 1/1991 | Takeuchi et al. | 525/276 |
| 5,079,319 | 1/1992 | Mueller | 526/245 X |
| 5,194,541 | 3/1993 | Legros et al. | 526/245 |
| 5,225,505 | 7/1993 | Wiegert | 526/245 |
| 5,264,531 | 11/1993 | Fukui et al. | 526/245 |
| 5,324,763 | 6/1994 | Rossler et al. | 524/520 |
| 5,336,581 | 8/1994 | Inaba et al. | 523/201 X |
| 5,484,677 | 1/1996 | Inaba | 430/110 |

FOREIGN PATENT DOCUMENTS

| | | |
|---|---|---|
| 0 176 609 | 4/1986 | European Pat. Off. |
| 0 182 516 | 5/1986 | European Pat. Off. |
| 0 195 661 | 9/1986 | European Pat. Off. |
| 0 312 964 | 4/1989 | European Pat. Off. |
| 0 393 480 | 10/1990 | European Pat. Off. |
| 0 408 422 | 1/1991 | European Pat. Off. |
| 2 656 316 | 6/1991 | France. |

OTHER PUBLICATIONS

Chemical Abstracts, JP 1–40510, 10 Feb. 1989.
Chemical Abstract, vol. 101(22):193052d, 16 Jul. 1984.
Chemical Abstracts, vol. 115(22):233147m, 9 May 1991.
Abstract, CA109(22):191778m, JP 63092623, 23 Apr., 1988.
Abstract, CA109(18):150275b JP 63092606, 23 Apr. 1988.
Abstract, CA119(24):252235n, JP 05140237, 6 Aug. 1993.
Abstract, CA118(14):126611y, JP 04248821, 4 Sep. 1992.
Abstract, CA101(26):231422j, JP 59147011, 23 Aug. 1984.
Abstract, CA101(26):231421h, JP 59247010, 23 Aug. 1984.
Abstract, CA101(22):193051c, JP 59124915, 19 Jul. 1984.
Abstract, CA101(20):171961x, JP59098116, 6 Jun. 1984.
Abstract, CA101(12):91684u, JP 59074111, 26 Apr. 1984.
Abstract, CA111(13):112027f, JP 63228069, 22 Sep. 1988.
Abstract, CA112(6):37444e, JP 01144403, 6 Jun. 1989.
Abstract, CA 112(17):154858d, JP 01170854, 5 Jul. 1989.
Abstract, CA119(16):167494b, JP 05148122, 15 Jun. 1993.
Abstract, CA105(10):79542w, JP 61019615, 28 Jan. 1986.
Abstract, CA106(21):172482g, JP 61274260, 4 Dec. 1986.
Abstract, CA107(22):200522m, JP 62100511, 11 May 1987.

*Primary Examiner*—Judy M. Reddick
*Attorney, Agent, or Firm*—Millen, White, Zelano & Branigan, P.C.

[57] ABSTRACT

This fluorinated (meth)acrylic latex consists of a dispersion of particles or of a mixture of dispersions of particles, these dispersions being obtained by emulsion polymerization in an aqueous medium, in at least one stage, wherein one more perfluorinated monomer(s) of formula (I) has/have been used as sole fluorinated comonomer(s) for the formation of the particles, and which is/are distributed statistically in particles formed in one stage or distributed statistically in the shell of structured particles of the core-shell or core-intermediate layer(s)-shell type resulting from a polymerization in two stages and in more than two stages, respectively, the said latex consisting of a dispersion of the said structured particles or of a mixture of at least one dispersion of the said fluorinated structured particles and/or at least one dispersion of the said fluorinated statistical particles and at least one dispersion of unfluorinated statistical particles, the monomer or monomers of formula (I) representing less than 80% by weight of the shell of the fluorinated structured particles, the proportion of monomers of formula (I) relative to the collective monomers used to form all of the particles of the said latex being between 1.8 and 20% by weight.

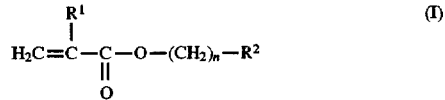

$R^1 = CH_3$ or H; $R^2 =$ perfluorinated $C_1-C_{10}$ alkyl; and $0 < n \leq 4$.

36 Claims, No Drawings

FLUORINATED ACRYLIC AND METHACRYLIC LATICES AND MIXTURES THEREOF, PROCESSES FOR MANUFACTURING THEM AND THEIR APPLICATIONS IN THE FIELD OF HYDROPHOBIC COATINGS

BACKGROUND OF THE INVENTION

The present invention relates to fluorinated acrylic and methacrylic latices and mixtures thereof having a low fluorine content, as well as to processes for manufacturing them.

"Latices" are understood to mean aqueous dispersions of polymer particles, such as are obtained by emulsion polymerization.

These dispersions participate in formulations of compositions intended for application, for example, by splashing, float, roller, brush, spray, threaded rod or impregnation, to produce a uniform deposit according to the desired thickness on substrates such as concretes, bricks, breeze blocks, wood, synthetic textiles, leathers, metals, old paintings, and the like, to provide them, after drying at a temperature in the region of room temperature, with hydrophobic protective coatings. As examples of these compositions for coatings, paints for application to the widest variety of substrates in the building field, such as exterior paints, rough plasters, and the like, varnishes for leathers, dressings for leathers and textiles, varnishes for wood, and the like, may be mentioned. The present invention also relates to all these applications.

As monomers capable of imparting hydrophobic performance characteristics to such latices, there may be mentioned the monomers of formula (I):

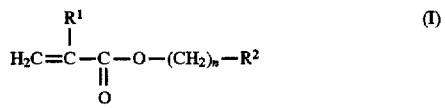

in which:

R$^1$ represents CH$_3$ or H;

R$^2$ represents a perfluorinated C$_1$–C$_{10}$ alkyl radical; and 0<n≦4, and in particular 2,2,2-trifluoroethyl (meth)acrylate.

The polymerization of trifluoroethyl methacrylate has been the subject of various studies to obtain dispersions of polymers which can be used as vehicles for physiologically active substances and which are stable in a saline medium (JP-A-61-019,615; EP-A-182,516; JP-A-61-274,260; JP-A-62-100,511), as antistatic agents for electrophotographic developers (JP-A-63-092,623; JP-A-63-092,606) and as coatings (FR-A-2,656,316; JP-A-05,140,237; JP-A-04,248, 821; EP-A-408,422).

The preparation of dispersions of structured particles based on 2,2,2-trifluoroethyl (meth)acrylate has also been described for obtaining particles possessing three or four layers of different natures and possessing a high weight fraction (of the order of 75–95%) in these fluorinated monomers (JP-A-59-147,011, 59-147,010, 59-122,512, 59-124,915, 59-098,116 and 59-07,411). The applications of these polymers are directed towards the sheathing of optical fibres, and the films obtained by fusion of the particles possess good resistance to water and to oil. In these patent documents, the polymers obtained cannot be used to produce hydrophobic coatings such as paints and dressings for textiles and leathers on account of their very high glass transition temperature.

The polymerization of 2,2,2-trifluoroethyl methacrylate to give structured particles has also been developed in order to obtain dispersions which are stable in a saline medium and which can be used as vehicles for physiologically active substances (JP-A-63-228,069, 01,040,510, 01,144,403 and 01,170,854). The role of the 2,2,2-trifluoroethyl methacrylate as hydrophobic monomer is to limit the polymerization of (meth)acrylic acid in water and to promote its incorporation into the shell of the particles. In this case, the polymers cannot be used in coatings on account of their excessively high glass transition temperature.

The synthesis of structured particles containing 2,2,2-trifluoroethyl methacrylate or 2,2,3,3-tetrafluoropropyl methacrylate in combination with tert-butyl methacrylate as shell and a core of the methyl methacrylate/butyl acrylate/ neutralized acrylic acid type has been described for participating in the composition of a nail varnish (JP-05,148,122).

The synthesis of fluorinated structured particles has also been described for obtaining organosoluble fluorinated powders (EP-393,480). In this case, the core of the particles consists of polytetrafluoroethylene and the shell, of a fluorinated polyacrylate.

Hence it will be noted that, in the patent documents dealing with the emulsion polymerization of 2,2,2-trifluoroethyl methacrylate, little work has been devoted to the devising of dispersions which provide hydrophobic coatings by coalescence of the particles.

It is known, moreover, that mixtures of latices constitute a technique for improving the properties of a latex. Thus, it is possible to produce a latex possessing an advantageous level of a property and to use it as masterbatch to introduce into a latex not possessing the desired property. The level of the property which is obtained is generally intermediate between those of the two latices, and depends on the relative proportions of each of the two.

In the adhesives field, it is known that the sticking power ("tack" property) is mainly imparted by polymers of relatively low mass, while the property of cohesion of the adhesive film is improved by polymers of greater mass. The use of mixtures of latices possessing these features thus constitutes an advantageous means of obtaining the desired mass polydispersity, and one which is generally easier than by a direct polymerization.

Mixtures of latices may also be used with the object of effecting a crosslinking of the film at the time of coalescence and interpenetration of the particles. In this case, two latices which bear chemically antagonistic functional groups are synthesized separately. These latices are then mixed without bringing about a reaction between particles, and permit appropriate storage times. In contrast, during the phase of interpenetration of the particles, chemical reaction takes place and enables the cohesion and the mechanical properties of the film to be strengthened. These two-component systems obtained by mixing latices are described, for example, in European Patents EP-195,661 and EP-176,609.

The small number of fluorine atoms borne by 2,2,2-trifluoroethyl methacrylate necessitates a large incorporation of this monomer in a polymer formulation in order to obtain satisfactory hydrophobic performance characteristics. It can thus be seen that the amounts of this relatively expensive fluorinated monomer which are needed in order to impart hydrophobic performance characteristics in the applications described (coating of optical fibres, and the like) are relatively large; such amounts are greater than those permitted on economic grounds for the applications towards which the present invention is directed, which relate to products intended for widespread distribution (paints, varnishes, and the like).

For these reasons, the devising of fluorinated latices, intended for use for the synthesis of dispersions giving hydrophobic coatings by coalescence, in which the fluorinated monomers of the type mentioned above would participate in optimized amounts, would hence constitute a considerable improvement to our knowledge in this field, and would contribute to promoting the use of these fluorinated monomers for the fields of application referred to.

SUMMARY OF THE INVENTION

Members of the Applicant Company hence sought to develop film-forming fluorinated (meth)acrylic latices giving hydrophobic coatings by coalescence under conditions in the vicinity of room temperature and without requiring excessively large amounts of coalescence agents (such as benzyl alcohol, butyl diglycol, and the like), these new latices having a very considerably decreased content of fluorinated monomer and nevertheless retaining advantageous performance characteristics in the field of hydrophobicity, namely a decrease in the wettability of the film by water and an increase in the wet abrasion strength.

This objective was achieved, surprisingly, with fluorinated latices containing structured particles possessing a thin shell rich in fluorinated monomer, as well as with mixtures of fluorinated latices with unfluorinated latices, these fluorinated latices advantageously being the above ones containing structured particles. In the case of the mixtures of fluorinated latices and unfluorinated latices of the present invention, it is even more surprising that the performance characteristics obtained are superior or equal to the performance characteristics of the starting fluorinated latex, and not intermediate between those of the latter and those of the unfluorinated latex. The retention of the good hydrophobicity properties of the films corresponds, according to the analysis performed, to a self-stratification of the polymer film, the fluorinated latex, having a lower surface tension than the unfluorinated latex, migrating to the air/polymer interface in order to minimize the energy of the system.

The subject of the present invention is hence a fluorinated (meth)acrylic latex consisting of a dispersion of particles or of a mixture of dispersions of particles, these dispersions being obtained by emulsion polymerization in an aqueous medium, in at least one stage, wherein one or more perfluorinated monomer(s) of the formula (I) as defined above has/have been used as sole fluorinated comonomer(s) for the formation of the particles, and which is/are distributed statistically in particles formed in one stage or distributed statistically in the shell of structured particles of the core-shell or core-intermediate layer(s)-shell type resulting from a polymerization in two stages and in more than two stages, respectively, the said latex consisting of a dispersion of the said structured particles or of a mixture of at least one dispersion of the said fluorinated structured particles and/or at least one dispersion of the said fluorinated statistical particles and at least one dispersion of unfluorinated statistical particles, the monomer or monomers of formula (I) representing less than 80% by weight of the shell of the fluorinated structured particles, the proportion of monomers of formula (I) relative to the collective monomers used to form all of the particles of the said latex (formed from at least one dispersion) being between 1.8 and 20% by weight, and being in particular between 2 and 10% by weight.

These values may be compared with the range of 35 to 70% which would be that of fluorinated statistical particles yielding at least the same hydrophobic properties, determined by measuring contact angles or by measuring wet abrasion strength (see comparison between Tables 1 and 2 below).

Preferably, the monomer (I) is 2,2,2-trifluoroethyl (meth) acrylate.

The nature and proportion of the monomers participating in the composition of the fluorinated or unfluorinated statistical particles, as well as of the different stages of the structured particles, are chosen in such a way that the glass transition temperature of the polymers of which the said statistical particles or the said stages of the structured particles are composed is below or equal to 40° C., being in particular between −5° and 25° C. Good film-forming characteristics are thus retained without necessitating excessive application temperatures and excessively large amounts of coalescence agent.

According to an especially preferred embodiment of the present invention, the monomer composition of fluorinated statistical particles or of the shell of fluorinated structured particles is as follows, by weight, for a total of 100% by weight:

- 20–80%, in particular 35–70%, of at least one monomer (I);
- 20–80%, preferably 20–55%, of at least one (meth)acrylic or vinyl monomer capable of yielding a homopolymer having a low glass transition temperature;
- 0–30%, preferably 0–15%, of at least one (meth)acrylic, styrene or vinyl monomer capable of yielding a homopolymer having a high glass transition temperature;
- 0–10%, preferably 0–2%, of at least one carboxylic (meth)acrylic monomer;
- 0–3%, preferably 0–2%, of at least one crosslinking (meth)acrylic monomer; and
- 0–5%, preferably 0–2%, of at least one hydrophilic (meth) acrylic monomer.

In the foregoing, "low glass transition temperature" is understood to mean a temperature generally of between −80° and −20° C.; and "high glass transition temperature" is understood to mean a temperature generally of between +10° and 200° C.

A (meth)acrylic monomer capable of yielding a homopolymer having a low glass transition temperature is advantageously chosen from alkyl (meth)acrylates such as ethyl acrylate, butyl acrylate, 2-ethylhexyl acrylate and nonyl acrylate. A vinyl monomer of this type is, in particular, vinyl 2-ethylhexanoate.

A (meth)acrylic monomer capable of yielding a homopolymer having a high glass transition temperature is, in particular, methyl methacrylate. A vinyl monomer of this type is, in particular, vinyl acetate. A styrene monomer of this type is, in particular, styrene.

Among carboxylic (meth)acrylic monomers, acrylic acid and methacrylic acid may be mentioned especially.

The crosslinking monomers are chosen, in particular, from hydrophilic crosslinking agents such as N-methylol (meth)acrylamide and (isobutoxymethyl)acrylamide, and hydrophobic crosslinking agents such as ethylene glycol di(meth)acrylate, butanediol di(meth)acrylate, hexanediol di(meth)acrylate and methacrylic anhydride.

As regards the hydrophilic (meth)acrylic monomers, these are chosen, in particular, from ethylimidazolidone (meth) acrylate and acrylamide.

As regards the monomer composition of unfluorinated statistical particles and of the core of fluorinated structured particles, this is, in particular, as follows, by weight, for a total of 100% by weight:

- 20–80%, in particular 40–70%, of at least one (meth) acrylic or vinyl monomer capable of yielding a homopolymer having a low glass transition temperature;

20–80%, in particular 30–60%, of at least one (meth) acrylic, styrene or vinyl monomer capable of yielding a homopolymer having a high glass transition temperature;

0.5–10%, in particular 0.5–2.5%, of at least one carboxylic (meth)acrylic monomer;

0.3–5%, in particular 0.5–3%, of at least one crosslinking (meth)acrylic monomer; and, in the case of the core of structured particles, 0–0.3%, in particular 0–0.2%, of at least one bifunctional compatibilizing or grafting monomer in the case where the crosslinking monomer is N-methylolacrylamide.

As monomers capable of yielding homopolymers having a low Tg, monomers capable of yielding homopolymers having a high Tg, carboxylic (meth)acrylic monomers and crosslinking monomers which participate in the abovementioned composition, there may be mentioned the same ones as are indicated above for the formation of the fluorinated statistical particles and of the shell of the fluorinated structured particles. As regards the compatibilizing or grafting monomers, these are chosen, in particular, from diallyl maleates, allyl(meth)acrylate and butanediol dimethacrylate, the latter also being a crosslinking agent.

It is also possible to use, as shell comonomer of statistical or structured particles, a fluorinated monomer of formula (I) different from 2,2,2-trifluoroethyl (meth)acrylate, such as a (perfluoroalkyl)ethyl (meth)acrylate. However, the use of these monomers boosts the cost of the polymer, which is not desirable in practice.

In the case of the structured fluorinated particles, it is preferable that the weight proportion of the shell represents 3 to 30%, preferably 5 to 20%, by weight of the said particles, for a size of the latter of between 100 and 300 nm. This particle size is, moreover, general aimed at in order to endow the resulting films of hydrophobic coatings with sufficient gloss properties.

The particle concentration of the latex according to the invention is generally between 10 and 65%, especially between 40 and 55%, by weight of the total weight of the dispersion.

The subject of the present invention is also a process for preparing a latex as defined above, characterized in that at least one aqueous dispersion of fluorinated (meth)acrylic particles of core-shell or core-intermediate layer(s)-shell structure is prepared, the monomer or monomers (I) participating in the constitution of the shell of the said particles, in that the dispersions obtained are, where appropriate, mixed with one another, and in that the dispersion or dispersions obtained is/are, where appropriate, mixed with at least one aqueous dispersion of unfluorinated statistical (meth)acrylic particles, or alternatively in that at least one aqueous dispersion of fluorinated statistical (meth)acrylic particles is prepared using as comonomer one or more compounds of formula (I), in that the dispersions obtained are, where appropriate, mixed with one another and in that the resulting dispersion or dispersions is/are mixed with at least one aqueous dispersion of unfluorinated statistical (meth)acrylic particles, all the abovementioned aqueous dispersions being made by emulsion polymerization in an aqueous medium in one or more stages depending on the case.

The preparation of the dispersions of particles having a core-shell or core-intermediate layer(s)-shell structure may be performed by the following known methods:

(a) polymerization of a mixture of monomers rich in monomer(s) (I) on a seed not containing any monomer (s) (I), in the presence of an emulsifying system not giving rise to the formation of new particles;

(b) successive polymerization of two mixtures of monomers, the first not containing any monomer(s) (I) and the second containing some, with the possibility of introducing the two mixtures sequentially according to a "shot" type process, or of introducing the second mixture slowly into the first pre-emulsion so as to establish a composition gradient bringing about compatibility between the core and the shell.

According to the techniques described in the literature, the grafting of the shell onto the core may be improved by using a grafting or compatibilizing monomer, preferably introduced at the end of polymerization of the core, for example after 75–80% of conversion of the core.

It is preferable to increase the mass of the core of the particles using, for example, crosslinking monomers such as the ones indicated above. However, the crosslinking of the core should not be too excessive in order to avoid any problem during the coalescence of the particles. This is satisfactorily achieved by the use of N-methylol(meth) acrylamides. The increase in the mass of the core of the fluorinated structured particles enables any reorganization of the morphology of the particles to be prevented, and the fluorinated polymer to be retained in the shell. In effect, as a result of the stronger hydrophobicity of the monomer or monomers (I), the polymer containing this/these monomer (s) would tend to migrate to the inside of the particles.

Similarly, to facilitate the coating of the core with the shell fluorinated polymer, it is preferable not to have too high a mass for the shell and to add an appropriate amount of a transfer agent such as an alkyl mercaptan (dodecyl mercaptan, tert-dodecyl mercaptan) or thioglycolic acid at the time of the polymerization of the shell. The amount of transfer agent should not, however, be too high in order not to impair the final mechanical properties of the polymer film. Up to 0.5% by weight, in particular up to 0.3% by weight, of transfer agent may thus be used relative to the monomers introduced into the shell.

An amount of crosslinking agent may also be introduced into the shell with a suitable amount of transfer agent.

Although the introduction of a monomer (I) into the core of the core-shell type particles does not give rise to difficulties, it is preferable according to the invention not to incorporate this monomer (I) in the core of the particles so as not to increase the cost of the latex. Furthermore, such an incorporation of monomer (I) in the core does not bring about a significant improvement in the hydrophobic performance characteristics.

The initiation system used for the synthesis of the structured particles can be a redox system such as $K_2S_2O_8$, $(NH_4)_2S_2O_8/Na_2S_2O_5$, $Na_2SO_3$, a thermal system such as $(NH_4)_2S_2O_8$ or a water-soluble azo compound such as 2,2'-azobis(2-amidinopropane) dihydrochloride (V.50 (WACO)). Preferred systems are the redox systems $(NH_4)_2S_2O_8/Na_2S_2O_5$ and $(NH_4)_2S_2O_8$ alone. The amounts used are between 0.2 and 0.5% by weight, preferably 0.25 to 0.35% by weight, relative to the monomers.

The emulsifying systems used for the preparation of the particles are chosen from the series of emulsifiers possessing a suitable hydrophilic/lipophilic balance. Preferred systems consist of a combination of an anionic surfactant such as nonylphenol sulphates containing 20–25 mol of ethylene oxide, dodecylbenzenesulphonate and ethoxylated fatty alcohol sulphates, with a nonionic surfactant such as ethoxylated nonylphenols containing 10–40 mol of ethylene oxide and ethoxylated fatty alcohols. The preferred system is a combination of oxyethylenated nonylphenol sulphate containing 25 mol of ethylene oxide and oxyethylenated nonylphenol containing 25 mol of ethylene oxide, in the preferred weight proportions of 50:50 to 85:25. The total amount of emulsifiers is from 2 to 4% by weight, preferably 2.5 to 3.5% by weight, relative to the monomers.

The preparation of the dispersions of structured particles according to the invention is preferably performed by a semi-continuous type process, enabling compositional deviations within the core and the shell to be limited, dependent on the ratios of reactivity of the different monomers. It is, however, possible to carry out the polymerization of the core batchwise.

The latices according to the invention are generally used as they are or in the form of mixtures of latices. In particular, mixtures of at least two latices, one containing a sufficient amount of monomer(s) (I) to lower the surface tension of the polymer appropriately, the other not containing any monomer(s) (I), may be mentioned. Although it does not constitute a decisive feature of the invention, a mixture may be made of several fluorinated latices (containing statistical or structured particles) having identical or different contents of monomer(s) (I) with one or more unfluorinated latices. Similarly, the mixing of a latex based on monomer(s) (I), a fluorinated latex based on a fluorinated monomer other than the monomer(s) (I) and an unfluorinated latex may also be envisaged.

The average particle size of the different latices may be different; it is, however, preferable to mix latices of similar sizes, or to use a fluorinated latex having an average size smaller than that of the unfluorinated latex.

Mixing of the latices may be carried out at a temperature of between 0° and 80° C., at atmospheric pressure, the use of a pressure higher than normal pressure not bringing about significant improvements in the process.

The introduction of a fluorinated latex into an unfluorinated latex leads to a result equivalent to the one obtained when the unfluorinated latex is introduced into the fluorinated latex.

It is, moreover, essential, when the mixing of two latices is carried out, for the introduction of one latex into the other not to give rise to a coagulation and destabilization of the dispersions. To this end, it is necessary for the emulsifiers stabilizing the particles of each latex to be compatible: these emulsifiers must not bear opposite charges, and are preferably anionic and/or nonionic surfactants with a similar hydrophilic/lipophilic balance for both latices.

To enhance the colloidal stability of the mixture of the two dispersions, it is also possible to add a further amount of emulsifier or of protective colloid such as hydroxymethylcellulose to the mixture, although the mixtures obtained are generally especially stable.

The invention also covers compositions intended to constitute a hydrophobic coating, such as a paint, in the building field, a varnish or dressing for leathers, a dressing for textiles or a protective varnish for wood, characterized in that they contain at least one latex as defined above.

The examples which follow further illustrate the invention without, however, limiting it. In the examples, the amounts are expressed in parts by weight, the total amount of monomers in each example being 100 parts.

TRIFEMA: 2,2,2-trifluoroethyl methacrylate
ALLYLMA: allyl methacrylate
MMA: methyl methacrylate
AA: acrylic acid
MAA: methacrylic acid
E$_2$HA: 2-ethylhexyl acrylate
BUA: butyl acrylate
NMA: N-methylolacrylamide
EA: ethyl acrylate
DDM: dodecyl mercaptan
NP 25EO: oxyethylenated nonylphenol containing 25 mol of ethylene oxide
NPS 25EO: oxyethylenated nonylphenol sulphate containing 25 mol of ethylene oxide
DE (%): dry extract, measured according to ISO Standard 1625 (1977)
MFT (°C.): minimum film-forming temperature, measured according to ISO Standard 2115 (1976)
ø (mm): average particle diameter, determined by means of a Lo-C autosizer distributed by the company "MALVERN Instruments", this apparatus employing the principle of quasi-elastic light scattering
Water contact angle (°): contact angle with water of a film; film formation is performed by depositing a specified thickness of latex by means of an applicator of 250 μm on a glass plate, followed by drying at room temperature for 8 hours and at 40° C. overnight; the contact angles are then determined by means of a goniometer on the conditioned plates over 2 days in a room in which the humidity is 50%; the measurement is performed with double-distilled water; the desired contact angle value is greater than or equal to 90°
Naphthalene contact angle (°): contact angle with naphthalene of a film obtained as above; the method used is the same as above, except that the measurement is performed with purified naphthalene
Surface tension $\gamma_s$

EXAMPLES

Examples 1 to 9 (reference)
Statistical Polymerization of TRIFEMA

Example 1 (reference)

A mixture of 49 parts of demineralized water, 0.05 part of NP 25EO, 0.25 part of NPS 25EO and 0.35 part of sodium metabisulphite is introduced into a 5-l reactor equipped with a central mechanical stirrer, a nitrogen inlet and a water condenser and heated by means of a waterbath.

After the contents of the reactor have been degassed with nitrogen and brought to 67° C., a pre-emulsion of 45 parts of water, 50 parts of MMA, 47 parts of BUA, 1 part of AA, 1 part of NMA, 1 part of TRIFEMA, 0.45 part of NP 25EO and 2.25 parts of NPS 25EO and a catalytic solution of 0.35 part of ammonium persulphate in 6 parts of demineralized water are introduced simultaneously over a period of 4 h 30 min.

During the introduction of the pre-emulsion and of the catalytic solution, the bath temperature and the stirrer speed are maintained at 67° C. and 200 rpm, respectively. When the introductions are complete, the bath temperature is maintained at 67°±1° C. for 1 h 30 min.

The dispersion is then cooled, filtered and taken to pH 9 by adding 20% NH$_3$ in water.

The characteristics obtained for this dispersion are recorded in Table 1 below.

Examples 2 to 9 (reference)

The procedure of Example 1 is repeated, modifying each time the composition of the monomers employed in the polymerization. The compositions used and the characteristics of the dispersions obtained are also recorded in Table 1, together with the contact angle with water as a property of the films obtained by coalescence of the latices.

During the introductions, the bath temperature and the stirrer speed are maintained at 67° C. and 200 rpm, respectively. When the introductions are complete, the bath tem-

TABLE 1

Statistical polymerization of TRIFEMA

| Example | 2* | 1 | 3 | 4 | 5 | 6 | 7 | 8 | 9 |
|---|---|---|---|---|---|---|---|---|---|
| Monomer composition (in parts by weight): | | | | | | | | | |
| MMA | 51 | 50 | 49 | 48 | 46 | 42.2 | 35.5 | 19.4 | 0 |
| BUA | 47 | 47 | 47 | 47 | 47 | 45.8 | 42.5 | 0 | 0 |
| AA | 1 | 1 | 1 | 1 | 1 | 1 | 1 | 1 | 1 |
| NMA | 1 | 1 | 1 | 1 | 1 | 1 | 1 | 1 | 1 |
| $E_2HA$ | 0 | 0 | 0 | 0 | 0 | 0 | 0 | 38.6 | 37 |
| TRIFEMA | 0 | 1 | 2 | 3 | 5 | 10 | 20 | 40 | 61 |
| Characteristics of the dispersion obtained: | | | | | | | | | |
| DE (%) | 49.9 | 52.0 | 50.0 | 50.0 | 50.0 | 50.0 | 50.0 | 50.3 | 50.4 |
| MFT (°C.) | 16 | 19.5 | 18 | 19 | 17.5 | 17.5 | 17.5 | 10 | 9.5 |
| φ (nm) | 147 | 161 | 139 | 151 | 161 | 140 | 155 | 216 | 212 |
| Property of the film obtained by coalescence of the latex: | | | | | | | | | |
| Water contact angle (°) | 78.5 | 78.9 | 76.7 | 78.9 | 79.1 | 80.5 | 82.3 | 88.5 | 92.0 |

*Example 2 is a control example (without TRIFEMA)

These results show that it is necessary to increase the TRIFEMA content greatly in order to obtain advantageous hydrophobic performance characteristics, namely water contact angles ≧900°. In effect, by polymerizing TRIFEMA statistically, a content of between 40 and 60% by weight has to be reached in order for the performance characteristics to be suitable.

Example 10

Polymerization of TRIFEMA to obtain structured particles

A mixture of 49 parts of demineralized water, 0.05 part of NP 25EO, 0.25 part of NPS 25EO and 0.35 part of sodium metabisulphite is introduced into a 5-1 reactor equipped with a central mechanical stirrer, a nitrogen inlet and a water-cooled reflux condenser and heated by means of a waterbath.

After the contents of the reactor have been degassed with nitrogen and brought to 67° C., a first pre-emulsion of 37.8 parts of water, 38.6 parts of MMA, 49.7 parts of BUA, 0.9 part of AA, 1 part of NMA, 0.38 part of NP 25EO and 1.89 part of NPS 25EO is introduced simultaneously with a solution of 0.31 part of ammonium persulphate in 5.3 parts of water over a period of 4 hours.

When these introductions are complete, a second pre-emulsion consisting of 7.2 parts of demineralized water, 0.1 part of AA, 10 parts of TRIFEMA, 5.7 parts of $E_2HA$, 0.07 part of NP 25EO and 0.36 part of NPS 25EO is introduced simultaneously with a catalytic solution of 0.04 part of ammonium persulphate in 0.7 part of water over a period of 30 minutes.

perature is maintained at 67°±1° C. for 1 h 30 min. The dispersion is then cooled, filtered and taken to pH 9 by adding 20% $NH_3$ in water.

The characteristics obtained for this dispersion and for the film are recorded in Table 2 below.

Example 11

The procedure of Example 10 is reproduced, adding 0.2 part of ALLYLMA in the last third of the introduction of the first pre-emulsion.

The characteristics obtained for this dispersion and for the film are also recorded in Table 2 below.

Examples 12 to 16

The procedure of Example 10 is reproduced, modifying the compositions of the pre-emulsions, as also shown in Table 2, with the characteristics of the dispersions thereby obtained and the water contact angle as a property of the films obtained by coalescence of the latices.

TABLE 2

| | | Example | | | | | | | | | | | | | |
|---|---|---|---|---|---|---|---|---|---|---|---|---|---|---|---|
| | | 10 | | 11 | | 12 | | 13 | | 14 | | 15 | | 16 | |
| | | parts | %* | parts | %* | parts | %* | parts | %* | parts | %* | parts | %* | parts | %* |
| Composition of the first pre-emulsion (core) | Total monomers | 90.2 | | 90.4 | | 96.2 | | 92.6 | | 88.0 | | 84.3 | | 84.3 | |
| | Water | 37.8 | | 37.8 | | 43.2 | | 41.7 | | 39.7 | | 37.9 | | 37.9 | |
| | MMA | 38.6 | 42.8 | 38.6 | 42.7 | 44.2 | 46.0 | 47 | 50.6 | 40.3 | 45.8 | 38.7 | 45.9 | 38.7 | 45.9 |
| | BUA | 49.7 | 55.1 | 49.7 | 55.0 | 50.0 | 52.0 | 43.7 | 47.1 | 45.6 | 51.8 | 43.7 | 51.8 | 43.7 | 51.8 |
| | AA | 0.9 | 1.0 | 0.9 | 1.0 | 0.95 | 1.0 | 0.93 | 1.0 | 0.94 | 1.0 | 0.84 | 1.0 | 0.84 | 1.0 |
| | NMA | 1 | 1.1 | 1 | 1.1 | 1 | 1.0 | 1 | 1.1 | 1 | 1.1 | 1 | 1.2 | 1 | 1.2 |
| | NP 25EO | 0.38 | | 0.38 | | 0.43 | | 0.42 | | 0.40 | | 0.38 | | 0.38 | |
| | NPS 25EO | 1.89 | | 1.89 | | 2.16 | | 2.08 | | 1.98 | | 1.89 | | 1.89 | |
| | ALLYLMA[a,b] | 0 | | 0.2[a] | 0.2 | 0 | | 0 | | 0.2[a] | 0.2 | 0.1[b] | 0.1 | 0.1[a] | 0.1 |
| Composition of the second pre-emulsion (shell) | Total monomers | 15.8 | | 15.8 | | 4 | | 7.37 | | 11.86 | | 15.86 | | 15.86 | |
| | Water | 7.2 | | 7.2 | | 1.8 | | 3.3 | | 5.3 | | 7.1 | | 7.1 | |
| | MMA | 0 | | 0 | | 0 | | 0 | | 0 | | 0 | | 0 | |
| | AA | 0.1 | 0.6 | 0.1 | 0.6 | 0.05 | 1.2 | 0.07 | 1.0 | 0.06 | 0.5 | 0.16 | 1.0 | 0.16 | 1.0 |
| | NMA | 0 | | 0 | | 0 | | 0 | | 0 | | 0 | | 0 | |
| | TRIFEMA | 10 | 63.3 | 10 | 63.3 | 2.5 | 62.5 | 5 | 67.8 | 7.5 | 63.2 | 10 | 63.1 | 10 | 63.1 |
| | E₂HA | 5.7 | 36.1 | 5.7 | 36.1 | 1.45 | 36.3 | 2.3 | 31.2 | 4.3 | 36.2 | 5.7 | 35.9 | 5.7 | 35.9 |
| | NP 25EO | 0.07 | | 0.07 | | 0.02 | | 0.03 | | 0.05 | | 0.07 | | 0.07 | |
| | NPS 25EO | 0.36 | | 0.36 | | 0.09 | | 0.17 | | 0.27 | | 0.36 | | 0.36 | |
| Characteristics of the dispersion | DE (%) | 50.8 | | 50.4 | | 51.3 | | 50.0 | | 50.0 | | 49.5 | | 51.6 | |
| | φ (nm) | 199 | | 177 | | 154 | | 154 | | 174 | | 174 | | 161 | |
| | MFT (°C.) | 10 | | 11.5 | | 10 | | 13.5 | | 10 | | 11 | | 10 | |
| Property of the film obtained by coalescence of the latex | Water contact angle (°) | 92 | | 93 | | 94 | | 90.4 | | 93 | | 97.2 | | 94.2 | |

[a]ALLYLMA introduced in the last third of introduction of the 1st pre-emulsion
[b]ALLYLMA introduced in the last quarter of introduction of the 1st pre-emulsion
*these percentages are obtained relative to the sum of the monomers (according to the case, for the first or for the second pre-emulsion)

The results of the measurements of the contact angles recorded in Table 2 prove the value of using the synthesis of structured particles possessing a shell rich in TRIFEMA (60–65%) for obtaining a film possessing hydrophobic properties.

The results obtained for an overall TRIFEMA content of between 2.5 and 10% by weight (Examples 10 to 16) are substantially better than those obtained for a statistical polymerization of TRIFEMA in the proportion of 61% by weight (Example 9).

Application Examples 17 to 21

Preparation of a paint from a dispersion containing TRIFEMA

A house paint having the following formulation is prepared:

| | Component | Parts by weight | Parts by volume |
|---|---|---|---|
| First group | Demineralized water | 78.0 | 106.7 |
| | Test dispersion containing 50.2% of dry extract by weight | 481.6 | 658.6 |
| | Non-associative thickener marketed by the company COATEX under the name "VISCOATEX 46" (32% by weight) | 4.7 | 6.4 |
| Second group | Bactericide marketed by the company "RIEDEL DE HAËN" under the name "MERGAL K6N" (100%) | 2.0 | 2.7 |
| | Fungicide marketed by PHAGOGENE Laboratories under the name "PARMETOL DF19" (100%) | 2.0 | 2.7 |
| | Wetting agent marketed by the company "BK-Ladenburg" under the name "CALGON N" (100%) | 0.6 | 0.8 |
| | Dispersant marketed by the company "COATEX" under the name "COATEX P/90" (40% by weight) | 3.0 | 4.1 |
| | Antifoaming agent marketed by the company "HENKEL-NOPCO" under the name "DEHYDRAN 1620" (100%) | 1.1 | 1.5 |
| | NH₃ (22%) | 1.2 | 1.6 |
| | TiO₂ marketed by the company "TIOXIDE" under the name "TR92" | 140.7 | 48.1 |
| | Calcium carbonate (filler) marketed by the company "OMYA" under the name "DURCAL 2" | 64.7 | 32.8 |
| | Calcium carbonate (filler) marketed by the company "OMYA" under the name "DURCAL 10" | 141.9 | 71.9 |
| | Mica (filler) marketed by the company "KAOLIN | 51.6 | 25.2 |

-continued

| | Component | Parts by weight | Parts by volume |
|---|---|---|---|
| | D'ARVOR" under the name "MICARVOR 20" | | |
| Third group | Propylene glycol (cosolvent) | 15.2 | 20.8 |
| | Coalescence agent marketed by the company "EASTMAN KODAK" under the name "TEXANOL" | 9.6 | 13.1 |
| | Antifoaming agent marketed by the company "HENKEL NOPCO" under the name "DEHYDRAN 1620" (100%) | 1.1 | 1.5 |
| | Associative thickener marketed by the company "SERVO DELDEN" under the name "SER AD FX 1010" (50% by weight) | 1.0 | 1.4 |
| | | 1000.0 | 1000.0 |

The components of the first group are dispersed for 5 minutes at slow speed, and the components of the second group are then introduced gradually and with stirring. The mixture is dispersed for 20 minutes at high speed and with cooling. Lastly, the components of the third group are introduced gradually and with stirring.

Paints were thus prepared from the dispersions obtained in Examples 14, 11, 10, 2 and 8.

The characteristics obtained for the paint films are described in Table No. 3.

TABLE NO. 3

| Application Example | Dispersion of Example | Water contact angle (°) | Naphthalene contact angle (°) | Permeability to water vapour (g/m²/24 h) |
|---|---|---|---|---|
| 17 | 14 | 96.0 | 45.7 | 169 |
| 18 | 11 | 97.5 | 43.0 | 166 |
| 19 | 10 | 93.8 | 36.7 | 169 |
| 20 | 2 | 80.3 | 23.8 | 183 |
| 21 | 8 | 90.6 | 40.6 | 116 |

The paints formulated according to Examples 17, 18 and 19, containing dispersions of structured particles having a TRIFEMA content, give rise to films which display greater hydrophobicity and oleophobicity than the films obtained, on the one hand according to Example 20, containing the control dispersion of Example 2 (without TRIFEMA), and on the other hand according to Example 21, containing the dispersion of Example 8 having 40% of TRIFEMA incorporated statistically. Moreover, the permeabilities of the films to water vapour are lowered to a lesser extent when dispersions of particles having a core-shell structure are used. These results confirm those obtained above on the unformulated dispersions.

Examples 22 to 29

Preparation of dispersions intended for formulation in dressings for leather and textiles Example 22

A mixture of 75 parts of demineralized water, 0.3 part of NPS 25EO and 0.3 part of sodium metabisulphite is introduced into a 5-1 reactor equipped with a central magnetic stirrer and a nitrogen inlet and surmounted by a reflux condenser.

The contents of the reactor are then degassed with nitrogen and thereafter heated to 55° C. When this temperature has been reached, 10% of the first pre-emulsion containing 62.1 parts of demineralized water, 49.9 parts of EA, 30.6 parts of MMA, 7.7 parts of AA, 1.8 parts of NMA and 2.43 parts of NPS 25EO, as well as 10% of the catalytic solution consisting of 0.3 part of ammonium persulphate in 6 parts of water, is introduced over 15 minutes while the temperature is maintained at 55° C.

The bath temperature is then maintained at 55° C. for 15 minutes, and introduction of the first pre-emulsion and of the catalytic solution over 2 h 15 min is thereafter resumed.

When the introduction of the first pre-emulsion is complete, the second pre-emulsion containing 6.9 parts of demineralized water, 5.32 parts of EA, 3.63 parts of TRIFEMA, 0.85 part of AA, 0.2 part of NMA, 0.03 part of DDM and 0.27 part of NPS 25EO is added while continuing to introduce the remainder of the catalytic solution and maintaining the temperature at 55° C.

When the introductions are complete, the reaction mixture is heated for 1 h to 80° C., then cooled to room temperature and filtered through a 30 μm filter.

The characteristics obtained for this dispersion are recorded in Table 4.

Examples 23 to 29

The procedure of Example 22 is reproduced, modifying each time the composition of the pre-emulsions. These compositions, as well as the characteristics of the dispersions obtained, are recorded in Table 4 below, with the properties of the films obtained by coalescence of the latices (contact angles).

TABLE 4

| | 22 | | 23* | | 24 | | 25 | | 26 | | 27 | | 28 | | 29** | |
|---|---|---|---|---|---|---|---|---|---|---|---|---|---|---|---|---|
| | parts | %*** | parts | %*** | parts | %*** | parts | %*** | parts | %*** | parts | %*** | parts | %*** | parts | %*** |
| 1st pre-emulsion | | | | | | | | | | | | | | | | |
| Total monomers | 90 | | 100 | | 80.2 | | 80.2 | | 95.0 | | 90.2 | | 90.1 | | 100 | |
| Water | 62.1 | | 69 | | 55.2 | | 55.2 | | 65.5 | | 62.1 | | 62.1 | | 69 | |
| MMA | 30.6 | 34.0 | 31 | 31 | 27.4 | 34.2 | 27.4 | 34.2 | 32.3 | 34.0 | 30.6 | 33.9 | 36.4 | 40.3 | 0 | 0 |
| EA | 49.9 | 55.4 | 58.4 | 58.4 | 44.4 | 55.4 | 44.4 | 55.4 | 52.7 | 55.5 | 49.9 | 55.3 | 49.9 | 55.3 | 50.5 | 50.5 |
| AA | 7.7 | 8.5 | 8.5 | 8.5 | 6.8 | 8.5 | 6.8 | 8.5 | 8.1 | 8.5 | 7.7 | 8.5 | 1.8 | 2.0 | 8.5 | 8.5 |
| NMA | 1.8 | 2.0 | 2 | 2 | 1.6 | 2.0 | 1.6 | 2.0 | 1.9 | 2.0 | 1.8 | 2.0 | 1.8 | 2.0 | 2 | 2.0 |

TABLE 4-continued

|  | 22 | | 23* | | 24 | | 25 | | 26 | | 27 | | 28 | | 29** | |
|---|---|---|---|---|---|---|---|---|---|---|---|---|---|---|---|---|
|  | parts | %*** | parts | %*** | parts | %*** | parts | %*** | parts | %*** | parts | %*** | parts | %*** | parts | %*** |
| NPS 25EO | 2.43 | | 2.70 | | 2.16 | | 2.16 | | 2.27 | | 2.43 | | 2.43 | | 2.70 | |
| ALLYLMA | 0 | 0 | 0 | 0 | 0 | 0 | 0 | 0 | 0 | 0 | 0.2 | 0.2 | 0.2 | 0.2 | 0 | 0 |
| TRIFEMA 2nd pre-emulsion | 0 | 0 | 0 | 0 | 0 | 0 | 0 | 0 | 0 | 0 | 0 | 0 | 0 | 0 | 39 | 39 |
| Total monomers |  |  |  |  |  |  |  |  |  |  |  |  |  |  |  |  |
| Water | 6.9 | | — | | 13.8 | | 13.8 | | 3.45 | | 6.9 | | 6.9 | | — | |
| MMA | | 0 | — | — | 0 | 0 | 0 | | 0 | 0 | 0 | 0 | 0 | 0 | — | — |
| EA | 5.32 | 53.2 | — | — | 10.64 | 53.2 | 10.64 | 53.2 | 0.11 | 2.2 | 1.75 | 17.5 | 1.75 | 17.5 | — | — |
| AA | 0.85 | 8.5 | — | — | 1.7 | 8.5 | 0.4 | 2.0 | 0.43 | 8.6 | 0.2 | 2.0 | 0.2 | 2.0 | — | — |
| NMA | 0.2 | 2.0 | — | — | 0.4 | 2.0 | 0.4 | 2.0 | 0.1 | 2.0 | 6 | 2.0 | 0.2 | 2.0 | — | — |
| TRIFEMA | 3.63 | 36.3 | — | — | 7.26 | 36.3 | 8.56 | 42.8 | 3 | 60.0 | 1.85 | 60.0 | 6 | 60.0 | — | — |
| E$_2$HA | | 0 | — | — | 0 | 0 | 0 | 0 | 1.36 | 27.2 | 0.27 | 18.5 | 1.85 | 18.5 | — | — |
| NPS 25EO | 0.27 | | — | | 0.54 | | 0.54 | | 0.13 | | 0.035 | | 0.27 | | — | |
| DDM | 0.03 | | — | | 0.06 | | 0.06 | | 0.02 | | | | 0.035 | | — | |
| % TRIFEMA in the shell | 36.3 | | — | | 36.3 | | 42.8 | | 60 | | 60 | | 60 | | — | |
| % by weight of the shell | 10 | | — | | 20 | | 20 | | 5 | | 10 | | 10 | | — | |
| DE (%) | 42 | | 43.5 | | 40.7 | | 40.2 | | 41.2 | | 40.4 | | 39.4 | | 40.5 | |
| MFT (°C.) | 9 | | 5 | | 2 | | 9 | | 9 | | 18 | | 18 | | 9.5 | |
| φ (nm) | 162 | | 162 | | 174 | | 166 | | 151 | | 158 | | 159 | | 208 | |
| Water contact angle at 20° C. (°) | 74 | | 63.6 | | 77.3 | | 86.6 | | 66.4 | | 69.2 | | 70.0 | | 78.8 | |
| Water contact angle at 160° C. (°) | | | 73.6 | | 86.3 | | 87 | | 93.5 | | 88.6 | | 88.7 | | 80.6 | |

*Example 23 is a control example of statistical polymerization, without TRIFEMA
**Example 29 is a reference example of statistical polymerization of TRIFEMA
***These percentages are obtained relative to the sum of the monomers (according to the case, for the first or for the second pre-emulsion)

Examples 22 to 29 show the strong influence of the thickness and composition of the fluorinated shell on the hydrophobic properties of the films. The incorporation of TRIFEMA in the shell of core-shell structured particles enables the hydrophobic performance characteristics of the film to be markedly improved relative to the control (Example 23) and relative to the statistical latex of Example 29 containing 39 parts of TRIFEMA.

Application Examples 30 to 34

Preparation of dressings for textiles and leathers

The latices of Examples 23 (control), 22, 24, 25 and 29 are then formulated in the following manner (Examples 30 to 34, respectively):

Black pigment marketed under the name
  "LEPTON" 20%
Latex 30%
Water 50%

These formulations were sprayed onto leather and dried at 60° C. The treated leathers are characterized according to a dynamic waterproofness method (ASTM Standard 2099-70 1973) and according to a method of determination of the translational rubfastness of the dyes or coating of a leather (NFG 52 301).

The results are collated in Table 5 below.

TABLE 5

|  | Example | | | | |
|---|---|---|---|---|---|
|  | 30 | 31 | 32 | 33 | 34 |
| Dispersion of Example | 23* | 22 | 24 | 25 | 29 |
| Overall % of TRIFEMA | 0 | 3.6 | 7.26 | 8.56 | 39 |
| Particle structure | Statistical | Core-Shell | Core-Shell | Core-Shell | Statistical |
| Number of flexing movements ASTM 2099-70 | 352 ± 138 | 375 ± 228 | 1078 ± 155 | 947 ± 457 | 1804 ± 441 |
| Wet rub-fastness** | 1 | 3 | 2 | 3.5 | 1 |

*Control
**Scoring of the results: 1 = less good; 5 = better.

The tests performed show an increase in the number of flexing movements with the introduction of TRIFEMA and an increase in the wet abrasion strength of the film. These results confirm the part played by TRIFEMA in enhancing the hydrophobic properties of the protective coatings. It will be noted that the wet rub-fastness is markedly improved by the polymerization of TRIFEMA in the shell of the particles.

Example 35 (reference)
Preparation of a latex without TRIFEMA

A mixture of 49 parts of demineralized water, 0.05 part of NP 25EO, 0.25 part of NPS 25EO and 0.35 part of sodium metabisulphite is introduced into a 5-1 reactor equipped with a central mechanical stirrer, a nitrogen inlet and a water condenser and heated by means of a waterbath. After the contents of the reactor have been degassed with nitrogen and brought to 67° C., a pre-emulsion of 45 parts of water, 51 parts of MMA, 47 parts of BUA, 1 part of AA, 1 part of NMA, 0.45 part of NP 25EO and 2.25 parts of NPS 25EO and a catalytic solution of 0.35 part of ammonium persulphate in 6 parts of demineralized water are introduced simultaneously in the space of 4 h 30 min.

During the introduction of pre-emulsion and of catalytic solution, the bath temperature and the stirrer speed are maintained at 67° C. and 200 rpm, respectively. When the introductions are complete, the bath temperature is maintained at 67°±1° C. for 1 h 30 min. The dispersion is then cooled, filtered and taken to pH 9 by adding 20% $NH_3$ in water.

The characteristics obtained for this dispersion and the properties of the films obtained by coalescence of the latices are shown in Table 6.

Examples 36 and 37 (reference)

The procedure of Example 35 is reproduced, modifying each time the composition of the monomers employed in the polymerization.

The characteristics of the dispersions obtained and the properties of the films obtained by coalescence of the latices are also recorded in Table 6.

TABLE 6

|  |  | Example | | |
|---|---|---|---|---|
|  |  | 35 | 36 | 37 |
| Composition of the monomers employed | MMA | 51 | 19.4 | 0 |
|  | BUA | 47 | 0 | 0 |
|  | AA | 1 | 1 | 1 |
|  | NMA | 1 | 1 | 1 |
|  | $E_2HA$ | 0 | 38.6 | 37 |
|  | TRIFEMA | 0 | 40 | 61 |
| Characteristics of the dispersions obtained | DE % | 52.0 | 50.3 | 50.4 |
|  | MFT (%) | 19.5 | 10 | 9.5 |
|  | ønm | 161 | 216 | 212 |
| Properties of the films obtained by coalescence of the latices | Water contact angle (°) | 72.9 | 88.5 | 92.2 |
|  | Surface tension (mN/m) $\gamma_s$ |  | 31.8 | 27.5 |

Examples 38 to 42
Example 37 fluorinated latex/Example 35 unfluorinated latex mixtures Five mixtures of different compositions were made, combining the fluorinated latex of Example 37 and the unfluorinated latex of Example 35 (Examples 38 to 42, respectively).

In Table 7, the properties of the films obtained by coalescence of these mixtures of latices have been recorded, together with those of the fluorinated and unfluorinated latices of Examples 37 and 35, respectively.

TABLE 7

| Example | Dispersion of Example 37 | Dispersion of Example 35 | % TRIFEMA | Water contact angle (°) | $\gamma_s$ (mN/m) |
|---|---|---|---|---|---|
| 37 | 100 | 0 | 61 | 92.2 ± 0.4 | 27.5 |
| 38 | 20 | 80 | 12.2 | 89.6 ± 1.5 | 29.0 |
| 39 | 10 | 90 | 6.1 | 92.7 ± 2.0 | 29.6 |
| 40 | 8 | 92 | 4.9 | 91.6 ± 1.8 | 29.8 |
| 41 | 6 | 94 | 3.7 | 89.2 ± 2.4 | 27.4 |
| 42 | 4 | 96 | 2.4 | 90.7 ± 2.2 | 23.9 |
| 35 | 0 | 100 | 0 | 78.5 ± 1.0 | 31.8 |

The films obtained by coalescence of the mixtures of latices display hydrophobic properties comparable to those obtained with the fluorinated latex alone, and hence show the value of this technique for minimizing the weight content of TRIFEMA needed for obtaining a protective coating possessing hydrophobic properties.

Examples 43 to 45
Example 11 fluorinated latex/Example 35 unfluorinated latex mixtures In the same manner as in Examples 38 to 42, mixtures of different compositions are made, combining the fluorinated latex of Example 11 with the unfluorinated latex of Example 35.

The results are collated in Table 8.

TABLE 8

| Example | % of dispersion of Example 11 | % of dispersion of Example 35 | % TRIFEMA | Water contact angle (°) | $\gamma_s$ mN/m) |
|---|---|---|---|---|---|
| 11 | 100 | 0 | 10 | 92.6 ± 1.5 | 30.6 |
| 43 | 50 | 50 | 5 | 92.2 ± 0.4 | 24.4 |
| 44 | 30 | 70 | 3 | 91.8 ± 1.0 | 27.5 |
| 45 | 20 | 80 | 2 | 92.7 ± 1.0 | 27.1 |
| 35 | 0 | 100 | 0 | 78.5 ± 1.0 | 31.8 |

In this case too, a retention of the hydrophobic performance characteristics is noted when the unfluorinated latex is added, enabling advantageous characteristics to be obtained for mass contents of TRIFEMA as low as 2%.

Examples 46 and 47
Mixtures of fluorinated latex of Example 10 and unfluorinated latex of Example 35

Mixtures of latices are made for different proportions of the fluorinated latex synthesized in Example 10 and the unfluorinated latex synthesized in Example 35. The results are collated in Table 9.

TABLE 9

| Example | % of dispersion of Example 10 | % of dispersion of Example 35 | % TRIFEMA | Water contact angle (°) | $\gamma_s$ mN/m) |
|---|---|---|---|---|---|
| 10 | 100 | 0 | 10 | 92.7 ± 1.9 | 29.5 |
| 46 | 50 | 50 | 5 | 92 ± 0.5 | 25.5 |
| 47 | 20 | 80 | 2 | 93 ± 1.0 | 27.3 |
| 35 | 0 | 100 | 0 | 78.5 ± 1.0 | 31.6 |

In these Examples 46 and 47, a marked improvement in the hydrophobic performance characteristics of the fluorinated latices is also noted.

Examples 48 and 49 (application examples)

Mixtures are made between the unfluorinated latex of Example 23 and the statistical fluorinated latex of Example 29 (Examples 48 and 49).

These mixtures are then formulated in the following manner:

Black pigment marketed under the name ρ"LEPTON" 20%

Latex mixture (or reference latex) 30%

Water 50%

These formulations are then sprayed onto leather and dried at 60° C. The treated leathers are characterized according to the methods described in Examples 30 to 34.

The results are recorded in Table 10.

TABLE 10

| Example | % of dispersion of Example 23 | % of dispersion of Example 29 | % TRIFEMA | Number of flexing movements ASTM 2099-70 | Wet rub-fastness |
|---|---|---|---|---|---|
| 23 | 100 | 0 | 0 | 352 ± 158 | 1 |
| 48 | 87.5 | 12.5 | 4.88 | 1595 ± 235 | 3 |
| 49 | 75 | 25 | 3.75 | 2325 ± 533 | 2.5 |
| 29 | 0 | 100 | 39 | 1804 ± 441 | 1 |

The mixing of fluorinated latex with the unfluorinated latex enables both the abrasion strength and the wet flexing strength to be improved relative to the control (Example 23) and relative to a latex containing a large amount of TRIFEMA distributed statistically (Example 29).

Examples 50 and 51

Mixtures are made of the unfluorinated latex of Example 23 and the fluorinated latex of core-shell structure of Example 25.

The characteristics of the films obtained by coalescence of the latices are recorded in Table 12.

TABLE 12

| Example | % of dispersion of Example 25 | % of dispersion of Example 25 | % TRIFEMA | Water contact angle (°) | γ, mN/m |
|---|---|---|---|---|---|
| 25 | 100 | 0 | 8.56 | 86.6 | 25.5 |
| 50 | 50 | 50 | 4.28 | 88.8 | 25.4 |
| 51 | 30 | 70 | 2.57 | 86.0 | 27.1 |
| 23 | 0 | 100 | 0 | 63.6 | 35.8 |

An improvement of the hydrophobic performance characteristics of the coatings is also noted in the case of the mixing of these latices.

The preceding examples can be repeated with similar success by substituting the generically or specifically described reactants and/or operating conditions of this invention for those used in the preceding examples.

The entire disclosures of all applications, patents and publications, cited above and below, and of corresponding French application 94/12431, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A fluorinated (meth)acrylic latex comprising at least one dispersion of polymeric particles, said dispersion being obtained by emulsion copolymerization in an aqueous medium, in at least one stage, wherein at least one perfluorinated monomer of formula (I):

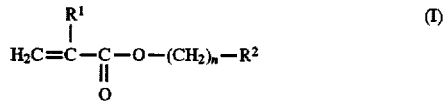

in which:

$R^1$ represents $CH_3$ or H;

$R^2$ represents a perfluorinated $C_1$–$C_{10}$ alkyl radical; and $0 < n \leq 4$, has been used as sole fluorinated comonomer for the formation of the polymeric particles, and is distributed statistically in unstructured copolymeric particles, the latter being formed in one stage, or distributed statistically in the shell of structured particles of core-shell or core-intermediate layer(s)-shell structure, said core-shell structured particles resulting from a polymerization in two stages and said core-intermediate layer(s)-shell structured particles resulting from a polymerization in more than two stages, said latex comprising a mixture of at least one dispersion of unfluorinated statistically copolymerized unstructured particles and at least one dispersion selected from the group consisting of (a) a dispersion of said fluorinated structured particles and (b) a dispersion of said fluorinated unstructured particles, the at least one monomer of formula (I) representing less than 80% by weight of the shell of the fluorinated structured particles, the proportion of monomer of formula (I) relative to the collective monomers used to form all of the particles of the said latex being between 1.8 and 20% by weight, the nature and proportion of the monomers participating in the composition of the fluorinated or unfluorinated unstructured particles, as well as the structured particles being such that the glass transition temperature of the polymers of which the said unstructured particles or the structured particles are composed is below or equal to 40° C., and wherein the monomer composition of the unfluorinated unstructured particles and of the core of fluorinated structured particles is as follows, by weight, for a total of 100 parts by weight:

20–80% of at least one (meth)acrylic or vinyl monomer capable of yielding a homopolymer having a low glass transition temperature between −80° and −20° C.;

20–80% of at least one (meth)acrylic, styrene or vinyl monomer capable of yielding a homopolymer having a high glass transition temperature between +10° and 200° C.;

0.5–10% of at least one carboxylic (meth)acrylic monomer;

0.3–5% of at least one crosslinking (meth)acrylic monomer; and, in the case of the core of structured particles, 0–0.3% of at least one of (a) at least one bifunctional compatibilizing monomer and (b) in the case where the crosslinking monomer is N-methylolacrylamide, at least one grafting monomer, and wherein the content of the dispersion of fluorinated particles is sufficient to provide a resultant coating having a water contact angle of at least 90°.

2. A process for preparing a latex as defined in claim 1, said process comprising emulsion polymerizing the monomers in an aqueous medium, in a single stage in the case of the unstructured particles, and in more then one stage in the case of the structured particles.

3. A latex according to claim 1, comprising said mixture of at least one dispersion of unfluorinated unstructured particles and at least one dispersion of fluorinated structured particles.

4. A latex according to claim 1, wherein the monomer composition of the fluorinated unstructured particles or of the shell of fluorinated structured particles is as follows, by weight, for a total of 100% by weight:
20–80% of at least one monomer (I);
20–80% of at least one (meth)acrylic or vinyl monomer capable of yielding a homopolymer having a low glass transition temperature between –80° and –20° C.;
0–30% of at least one (meth)acrylic, styrene or vinyl monomer capable of yielding a homopolymer having a high glass transition temperature between +10° and 200° C.;
0–10% of at least one carboxylic (meth)acrylic monomer;
0–3% of at least one crosslinking (meth)acrylic monomer; and
0–5% of at least one hydrophilic (meth)acrylic monomer.

5. A latex according to claim 4, comprising said mixture of at least one dispersion of unfluorinated unstructured particles and at least one dispersion of fluorinated unstructured particles.

6. A latex according to claim 4, comprising said mixture of at least one dispersion of unfluorinated unstructured particles and at least one dispersion of fluorinated structured particles.

7. A latex according to claim 6, wherein the core of fluorinated structured particles is as follows, by weight, for a total of 100 parts by weight:
40–70% of at least one (meth)acrylic or vinyl monomer capable of yielding a homopolymer having a low glass transition temperature of between –80° and –20° C.;
30–60% of at least one (meth)acrylic, styrene or vinyl monomer capable of yielding a homopolymer having a high glass transition temperature of between +10° and 200° C.;
0.5–2.5% of at least one carboxylic (meth)acrylic monomer;
0.5–3% of at least one crosslinking (meth)acrylic monomer; and, in the case of the core of structured particles,
0–0.2% of at least one of (a) at least one bifunctional compatibilizing monomer and (b) in the case where the crosslinking monomer is N-methylolacrylamide, at least one grafting monomer.

8. A latex according to claim 7, wherein the structured particle has a core of a copolymer of methyl (meth)acrylate, butyl acrylate, acrylic acid and N-methylolacrylamide; and a shell of a copolymer of acrylic acid, 2,2,2-trifluoroethyl (meth)acrylate and 2-ethylhexyl acrylate.

9. A latex according to claim 1, in the form of house paint, further comprising inorganic pigment, thickener, bactericide,-fungicide, wetting agent, anti-foaming agent, and cosolvent.

10. A latex according to claim 5, wherein the proportion of monomers of formula (I) relative to the collective monomers used to form all of the particles of the said latex is between 2 and 10% by weight.

11. A latex according to claim 6, wherein the proportion of monomers of formula (I) relative to the collective monomers used to form all of the particles of the said latex is between 2 and 10% by weight.

12. A latex according to claim 5, wherein the monomer composition of unfluorinated unstructured particles is as follows, by weight for a total of 100 parts by weight:
40–70% of at least one (meth)acrylic or vinyl monomer capable of yielding a homopolymer having a low glass transition temperature of between –80° and –20° C.;
30–60% of at least one (meth)acrylic, styrene or vinyl monomer capable of yielding a homopolymer having a high glass transition temperature of between +10° and 200° C.;
0.5–2.5% of at least one carboxylic (meth)acrylic monomer;
0.5–3% of at least one crosslinking (meth)acrylic monomer; and, in the case of the core of structured particles,
0–0.2% of at least one of (a) at least one bifunctional compatibilizing monomer and (b) in the case where the crosslinking monomer is N-methylolacrylamide, at least one grafting monomer.

13. A coated substrate obtained by coating a substrate with the latex according to claim 1.

14. In a process of coating a substrate, the improvement wherein said coating is conducted with the latex according to claim 1.

15. A latex according to 1, wherein the content of the dispersion of unfluorinated particles is at least 50% by weight of the total dispersion.

16. A coated substrate obtained by coating a substrate with the latex according to claim 15.

17. A latex according to claim 1 wherein the monomer (I) is 2,2,2-trifluoroethyl (meth)acrylate.

18. A latex according to claim 1, wherein the proportion of monomers of formula (I) relative to the collective monomers used to form all of the particles of the said latex is between 2 and 10% by weight.

19. A latex according to claim 1, wherein the monomer capable of yielding a homopolymer having a low glass transition temperature is an alkyl (meth)acrylate giving homopolymers having a glass transition temperature of between –80° and –20° C.: selected from the group consisting of ethyl acrylate, butyl acrylate, 2-ethylhexyl acrylate and nonyl acrylate.

20. A latex according to claim 1, wherein the monomer capable of yielding a homopolymer having said low glass transition temperature is vinyl 2-ethylhexanoate.

21. A latex according to claim 1, wherein the monomer capable of yielding a homopolymer having said high glass transition temperature is methyl methacrylate.

22. A latex according claim 1, wherein the vinyl monomer capable of yielding a homopolymer having said high glass transition temperature is vinyl acetate.

23. A latex according to claims 1, wherein the carboxylic (meth)acrylic monomer is acrylic acid or methacrylic acid.

24. A latex according to claim 1, wherein the crosslinking monomer is N-methylol(meth)acrylamide (isobutoxymethyl)acrylamide ethylene glycol di (meth)acrylate, butanediol di(meth)acrylate, hexanediol di(meth)acrylate or methacrylic anhydride.

25. A latex according to claim 4, wherein the hydrophilic (meth)acrylic monomer is present in the latex and is ethylimidazolidone (meth)acrylate or acrylamide.

26. A latex according to claim 1, characterized in that the compatibilizing or grafting monomer is a diallyl maleate, allyl (meth)acrylate or butanediol dimethacrylate.

27. A latex according to claim 1, wherein the weight proportion of the shell of the structured fluorinated particles represents 3 to 30%, by weight of the said particles, for a size of the latter of between 100 and 300 nm.

28. A latex according to claim 1 wherein the particle concentration is between 10 and 65%, by weight of the total weight of the dispersion.

29. A process according to claim 2, wherein to 0.5% by weight, of a transfer agent selected from the group consisting of an alkyl mercaptan, thioglycolic acid, and mixtures thereof relative to the monomers introduced, is added during the polymerization of the shell.

30. A paint or varnish, or leather or textile dressing composition comprising at least one latex as defined in claim 1.

31. A latex according to claim 1, wherein said glass transition temperature of the polymers of which the said unstructured particles or the structured particles are composed is between −5° C. and 25° C.

32. A latex according to claim 4, wherein the monomer composition of fluorinated statistical particles or of the shell of fluorinated structured particles is as follows, by weight for a total of 100% parts by weight:

35–70% of at least one monomer (I);
 20–55% of at lest one (meth)acrylic or vinyl monomer capable of yielding a homopolymer having a low glass transition temperature;
 0–15% of at least one (meth) acrylic, styrene or vinyl monomer capable of yielding a homopolymer having a high glass transition temperature;
 0–2% of at least one carboxylic (meth)acrylic monomer;
 0–2% of at least one crosslinking (meth)acrylic monomer; and
 0–2% of at least one hydrophilic (meth)acrylic monomer.

33. A latex according to claim 1, wherein the monomer composition of the unfluorinated statistical particles and of the core of fluorinated structured particles is as follows, by weight, for a total of 100 parts by weight:

40–70% of at least one (meth)acrylic or vinyl monomer capable of yielding a homopolymer having a low glass transition temperature;
 30–60% of at least one (meth)acrylic, styrene or vinyl monomer capable of yielding a homopolymer having a high glass transition temperature;
 0.5–2.5% of at least one carboxylic (meth)acrylic monomer;
 0.5–3% of at least one crosslinking (meth)acrylic monomer; and, in the case of the core of structured particles,
 0–0.2% of at least one bifunctional compatibilizing or grafting monomer in the case where the crosslinking monomer is N-methylolacrylamide.

34. A latex according to claim 27, wherein the weight proportion of the shell of the structured fluorinated particles represents 5–20% by weight of the said particles.

35. A latex according to claim 28, wherein the particle concentration is between 40–55% by weight of the total weight of the dispersion.

36. A process according to claim 29, wherein up to 0.3% by weight of said transfer agent, relative to the monomers introduced, is added during the polymerization of the shell.

* * * * *